Patented Oct. 6, 1936

2,056,669

UNITED STATES PATENT OFFICE 2,056,669

OIL DE-EMULSIFYING PROCESS

Max Powell, San Gabriel, Calif., assignor to Specialty Sales Corporation, Ltd., Los Angeles, Calif., a corporation of California No Drawing. Application June 2, 1936,
Serial No. 83,173

11 Claims. (Cl. 196—4)

This invention pertains to processes and reagents for de-emulsifying mineral oil emulsions, particularly petroleum and water emulsions of all types including those having tendencies toward great stability by reason of the presence of saline and organic materials.

The general purpose of the invention is to provide a process for breaking mineral oil emulsions, by the use of a new de-emulsifying reagent capable of successfully treating the most stable of emulsions, and possessing certain high important advantages over reagents heretofore used for the treatment of mineral oil emulsions. Outstanding among these advantages is the ability of the present reagent, when intimately admixed with the emulsion, to bring about separation of the oil and water in an unusually short period of time, and without the necessity for agitation or heating of the emulsion. Of course, if for any reason it may be desired to agitate or heat the emulsion while it is being acted upon by the reagent, resort may be had to such expedients. But from all indications that have developed from the treatment of various different emulsions, including highly stable forms and some containing high percentages of water in the presence of effective emulsifying agents, neither agitation nor heating are necessary. Consequently, I am able to eliminate the usual expense of heating the emulsion during treatment, and the costly loss of the lighter and more volatile constituents of the oil that ordinarily are vaporized as a result of heating or agitation.

In accordance with the invention, I utilize in the de-emulsifying reagent one or more of certain types of water soluble salts that when put into the emulsion, develop a high degree of ionization and destroy or render ineffective the emulsifying agent by reaction with the mineral salts therein to form compounds that, relatively at least, are water insoluble. At this point it may be mentioned that all the reasons underlying the action of the present reagent on the emulsion are not fully known, and that while for the purpose of describing the invention, certain explanations of a theoretical nature may be given, it is to be understood that these may be subject to modification in the light of future determinations. The types of water soluble salts contemplated by the invention for use in the reagent, are, generally, the thio salts, including the thio sulphates and the thio cyanates, or mixtures of those salts. It will be understood that any suitable salt of either type may be used, and that the selection of any particular salt or salts will depend upon the nature of the emulsion to be treated, and particularly the characteristics of the emulsifying agent. I may cite as typical, and generally preferred thio salts, sodium, potassium or ammonium thiosulphate and sodium, potassium or ammonium thiocyanate.

This thio salt preferably is put into aqueous solution in suitable concentration, say one pound of the salt in five gallons of water. I include in the aqueous solution a compound or selected combination of compounds, that together with the salt form an actuated and highly dispersible reagent having the capacity for thorough and rapid distribution throughout the emulsion, and a corresponding capacity for rapid breakdown of the emulsion phases. The last mentioned compound or compounds (which may be termed distributing agents since they act to distribute or disperse the salt intimately throughout the emulsion) to be used together with the thio salt, may be selected from two general classes of substances; the glycol ethers or the higher alcohols, including their isomers. Typical glycol ethers are diethylene glycol ethers of the mono-methyl, ethyl, propyl, etc., series. The higher alcohols include methyl, ethyl, propyl and butyl alcohols and their isomers. In the treatment of certain emulsions it may also be desirable to include in the reagent, relatively small amounts of acetic or lactic acids, or both. When a combination of the thio salt together with one or more of the higher alcohols, with perhaps small amounts of lactic and acetic acids, is used to make up the reagent, its composition in certain general respects resembles that of a reagent prepared in accordance with the method disclosed in the copending application of George B. Bavin and Max Powell, Ser. No. 78,894, filed on May 9, 1936. That application is directed to a process of treating mineral oil emulsions by the use of a reagent prepared by fermenting a solution to obtain a fermentation product containing the higher alcohols, and perhaps certain acids, and to which a suitable thio salt may be added for one purpose, among others, of activating the alcohols.

In preparing the de-emulsifying reagent, the several ingredients may be proportioned within any suitable limits to give the best results for the particular emulsion to be treated. Preferably, though not necessarily in all cases, the glycol ether or alcohol content of the reagent will be proportioned to adjust the specific gravity of the thio salt solution, to correspond closely to the specific gravity of the aqueous emulsion phase. When a glycol ether is used, I preferably employ a thiosulphate salt, usually sodium thiosulphate, in the reagent because of its relative cheapness and availability. A thiocyanate, e. g. sodium or potassium thiocyanate, preferably is employed where an alcohol or combination of alcohols are used instead of the glycol ether, because of the greater solubility of the thiocyanate in alcohol.

A typical reagent may be made up in the proportions of one pound of sodium thiosulphate to 2.43 pounds of diethylene glycol and 41.6 pounds, or approximately five gallons, of water. In any composition, the proportion may vary within wide limits depending upon the dilution desired. As stated before, relatively small amounts of lactic and acetic acids may be added if desired.

In the process of subjecting the emulsion to the action of the reagent, any of the usual or suitable methods may be employed for securing an intimate admixture of the reagent with the emulsion. For example, where the oil is flowing directly from the well into a storage or treating tank, the reagent may be injected at a measured rate into the flow line within which the reagent and emulsion are intimately admixed and then discharged into the tank wherein the emulsion is allowed to stand a length of time sufficient for the reagent to effect separation of the oil and water constituents of the emulsion. Again, the emulsion may be put directly into the tank, and the emulsion perhaps agitated to whatever extent may be necessary and until dispersion of the reagent. Beyond the mere admixing of the reagent with the emulsion in the tank, no further operations appear to be necessary to enable the reagent to effectively and completely break the emulsion. As observed hereinabove, the present reagent appears to have the distinctive characteristic of not requiring that the emulsion be subjected to agitation, excepting for mere admixing, or heating during the treating period. The effectiveness of the reagent to break emulsions within an unusually short period of time, has been evidenced by past operations in the treatment of five hundred barrel lots of oil. In a typical run, the oil was discharged into the treating tank over a period of hours, during which around three gallons of the reagent was injected into the flow line at a slow uniform rate. The emulsion, containing a high percentage of water, was then allowed to stand for about twelve hours, at the end of which time the water was drained off and the remaining oil tested for water. The water content of the treated oil was found to be less than 0.6%.

For the purpose of further ascertaining the effectiveness of the de-emulsifying reagent, the treated oil was allowed to remain in the tank and several hundred barrels of emulsion coming directly from the well and unmixed with additional reagent, were pumped into the tank and mixed with the previously dehydrated oil. After about twelve hours and without further reagent being added, the water was drained from the tank and the remaining oil tested for water. The water content again was below 0.6%. Thus it appears, and the invention so contemplates, that a successive quantity of emulsion may be treated simply by admixture with the oil remaining after previous treatment of a quantity of emulsion to which the reagent has been added.

I claim:

1. The method of treating crude petroleum emulsions that includes subjecting the emulsion to the action of a reagent comprising an aqueous thio salt solution, and a distributing agent dissolved in said solution and acting to disperse said salt throughout the emulsion.

2. The method of treating crude petroleum emulsions that includes subjecting the emulsion to the action of a reagent comprising an aqueous thio salt solution, and a distributing agent dissolved in said solution and acting to disperse said salt throughout the emulsion, the volume of water being substantially in excess of the volume of the distributing agent.

3. The method of treating crude petroleum emulsions that includes subjecting the emulsion to the action of a reagent comprising an aqueous thio salt solution, a distributing agent dissolved in said solution and acting to disperse said salt throughout the emulsion, and an acid.

4. The method of treating crude petroleum emulsions that includes subjecting the emulsion to the action of a reagent comprising an aqueous thiosulphate salt solution, and a distributing agent dissolved in said solution and acting to disperse said salt throughout the emulsion.

5. The method of treating crude petroleum emulsions that includes subjecting the emulsion to the action of a reagent comprising an aqueous thiocyanate salt solution, and a distributing agent dissolved in said solution and acting to disperse said salt throughout the emulsion.

6. The method of treating crude petroleum emulsions that includes subjecting the emulsion to the action of a reagent comprising an aqueous thio salt solution, and a glycol ether dissolved in said solution.

7. The method of treating crude petroleum emulsions that includes subjecting the emulsion to the action of a reagent comprising an aqueous thio salt solution, and a water soluble alcohol dissolved in said solution.

8. The method of treating crude petroleum emulsions that includes subjecting the emulsion to the action of a solution containing a water soluble thiosulphate salt dissolved in a distributing agent acting to disperse the salt throughout the emulsion.

9. The method of treating crude petroleum emulsions that includes subjecting the emulsion to the action of a solution containing a water soluble thiosulphate salt dissolved in a glycol ether acting to disperse the salt throughout the emulsion.

10. The method of treating crude petroleum emulsions that includes subjecting the emulsion to the action of a reagent comprising an aqueous thiosulphate solution, and a diethylene glycol ether dissolved in said solution.

11. The method of treating crude petroleum emulsions that includes subjecting the emulsion to the action of a reagent comprising an aqueous sodium thiosulphate solution and a diethylene glycol ether, the volume of water being substantially in excess of the volume of the diethylene glycol ether.

MAX POWELL.